US012743454B1

(12) United States Patent
Al-Rikabi et al.

(10) Patent No.: US 12,743,454 B1
(45) Date of Patent: Sep. 22, 2026

(54) FUZZY MATCHING NATURAL LANGUAGE QUERY FROM USER SPECIFIC METADATA

(71) Applicant: Amazon Technologies, Inc., Seattle, WA (US)

(72) Inventors: Amjad Al-Rikabi, Seattle, WA (US); Stephen Michael Ash, Seattle, WA (US); Anuj Chauhan, New York, NY (US); Rishav Chakravarti, White Plains, NY (US); Wuwei Lan, Princeton Junction, NJ (US); Jerry Lin, New York, NY (US); Gregory David Adams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 18/962,775

(22) Filed: Nov. 27, 2024

(51) Int. Cl.
*G06F 16/30* (2019.01)
*G06F 16/31* (2019.01)
*G06F 16/334* (2025.01)
*G06F 16/383* (2019.01)

(52) U.S. Cl.
CPC ........ *G06F 16/3344* (2019.01); *G06F 16/316* (2019.01); *G06F 16/383* (2019.01)

(58) Field of Classification Search
CPC ... G06F 16/3344; G06F 16/316; G06F 16/383
See application file for complete search history.

(56) References Cited

U.S. PATENT DOCUMENTS

2018/0068474 A1* 3/2018 Mowatt ................. G06F 16/532
2022/0405314 A1* 12/2022 Du .......................... G06F 40/56

* cited by examiner

*Primary Examiner* — Ibrahim Siddo
(74) *Attorney, Agent, or Firm* — Knobbe, Martens, Olson & Bear, LLP

(57) ABSTRACT

Systems and methods are provided for an improved business intelligence platform that maintains and uses personalized data cache for processing natural language queries with personalized fuzzy matching in lieu of using predefined indexes of large amounts of data. The systems and methods provide for performing fuzzy matching using a natural language query and a personalized data cache storing a copy of data previously provided in response to interactions associated with a user profile, wherein the personalized data cache is separate from a data source storing the response data, and wherein the fuzzy matching does not use any fuzzy index of the data source generated prior to receiving the natural language query; obtaining, from results of the fuzzy matching, a set of query terms; obtaining the response data from the data source using the set of query terms; and generating a response to the natural language query using the response data.

20 Claims, 5 Drawing Sheets

FUZZY MATCHING NATURAL LANGUAGE QUERY FROM USER SPECIFIC METADATA

BACKGROUND

Computing systems can utilize data sets that can answer natural language questions regarding a particular subject area utilizing a very large index of all specific values of a database. The computing system requires a large amount of data to correctly answer the natural language question.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
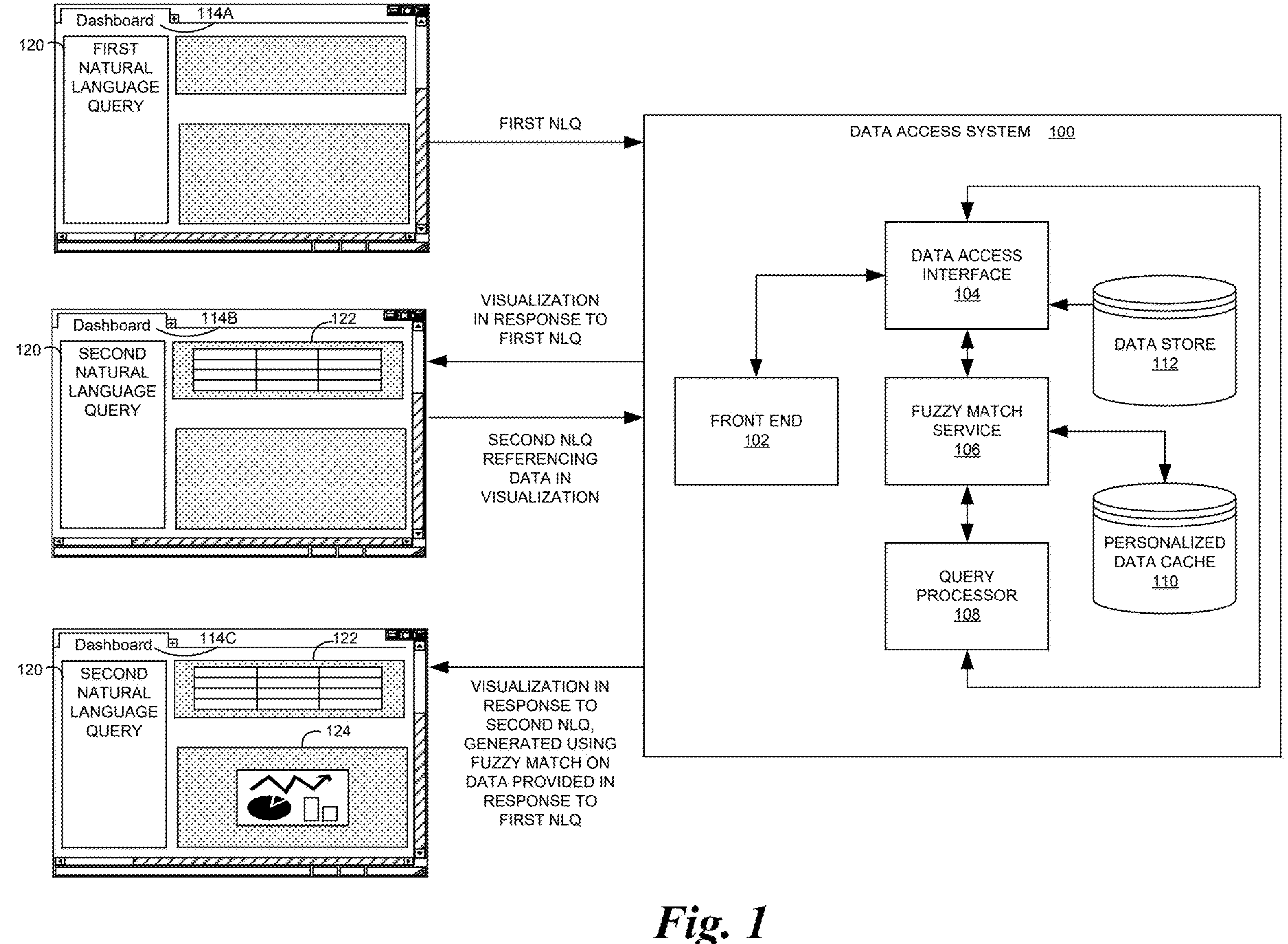
FIG. 1 is a diagram illustrating user interface showing the effect of the fuzzy matching system.

The present disclosure relates to processing natural language queries in a multi-dimensional database with personalized fuzzy matching in lieu of limited predefined indexes of large amounts of data. More specifically, aspects of the present disclosure describe a mechanism for maintaining a personalized data cache of data values that have been previously displayed, utilized, or otherwise provided to a user, such as data provided in a dashboard visualization accessed through an enterprise database query platform (e.g., a business intelligence platform). When the user submits a natural language query to the business intelligence platform or another diverse high-volume data access system that maintains such a personalized data cache, the system performs fuzzy matching on the natural language query with respect to the cached data values. Results of the fuzzy matching aid the system in determining the semantic meaning of the natural language query without extensive pre-indexing. The semantic meaning can then be used for querying a data set and providing data (e.g., raw data or a visualization) to the user in response to the natural language query.

Some natural language query processing systems use fuzzy matching (sometimes referred to as fuzzy searching) to account for typographical errors, inconsistent use of terminology, and other irregularities in natural language queries. For example, a user may submit a query of "Show me information about Ackme" when the user intends to request information about a company called "Acme." In this instance, a search performed using standard text matching methods will not return the desired results. To effectively deal with such irregularities, a data set may be indexed for fuzzy matching. Fuzzy matching is a technique that uses specific algorithms to find strings that approximately match strings being searched. One such algorithm measures the closeness of a match in terms of an "edit distance," which is a metric that represents the cost (in computing operations) of converting one string to another. For example, the Levenshtein distance is the minimum number of single-character changes needed to convert a search term to exactly match a target term. Returning to the example above, in a data set of company names, the term with the smallest edit distance from "Ackme" may be "Acme," which is the company about which the user intended to inquire. A query processing system may proceed with processing the query using the correct term "Acme" as a filter to find the requested information and respond to the user's query.

Some natural language query processing systems use semantic matching instead of fuzzy matching. In addition, similarity matching is a hybrid of fuzzy matching and semantic matching. Semantic matching is a technique that compares the meaning of terms, rather textual properties of the terms. For example, a user may submit a query of "Show me information about puppies," when the user is really interested in information about dogs generally. To effectively search by the semantic content of the query rather than the textual content, terms in the query may be converted to encoded formats for similarity matching (e.g., embeddings used in cosine similarity evaluation), or the terms may be evaluated using machine learning models configured to use the semantic meaning of input in other ways. Returning to the example above, a query processing system that uses semantic matching (or hybrid matching) that considers the semantic meaning of terms in the natural language query "Show me information about puppies" may return information about dogs generally.

Some enterprise data access systems, such as business intelligence platforms, provide access to data sets within a larger enterprise database repository. Business intelligence platforms can generate various visualizations of the data (charts), and facilitate user-friendly features such as natural language querying. To improve responsiveness and functionality, business intelligence platforms and other such systems require developers or other users to define subsets of data—sometimes referred to as "topics"—that specify which datasets are available to be accessed. To facilitate natural language query processing and searching of the data within a topic, the datasets are pre-indexed for category matching.

For some applications it may be desirable or necessary to forgo creation of a topic with its available data sets and corresponding pre-generated indexes (e.g., when creating a platform that allows users to later apply significant changes to available data sets). However, without pre-defining data sets available for natural language queries, there is not a corresponding pre-indexing that could assist natural language queries. One potential solution to address this technical limitation is pre-indexing the entire enterprise database repository available through the platform. However, performing a complete or significant pre-indexing to assist all variations of natural language query is a resource intensive process, especially for enterprise database repositories.

To address the limitations above, aspects of the present disclosure describe a "topicless" enterprise database querying system that enables natural language queries to extract relevant information without pre-indexing the entire enterprise database repository. Aspects of the present disclosure allow conservation of the substantial computing resources that would be needed to pre-index large data sets for data retrieval using natural language processing. Embodiments of the present disclosure integrate personalized data caches that store data available for fuzzy matching, semantic matching, or similarity matching. Personalized data caches are maintained interactively (e.g., as users interact with the business intelligence platform), and facilitate fuzzy matching. Moreover, a personalized data cache facilitates fuzzy matching without requiring full pre-indexing of an entire enterprise database repository, or without requiring pre-indexing of any kind prior to receiving a natural language query being processed using the personalized data cache. For example, a personalized data cache may store data that is displayed to or otherwise provided to a user over the course of a limited period of time (e.g., minutes, hours, or days), and the cached data may be available for personalized fuzzy matching in near-real-time. The personalized data cache takes advantage of patterns in data access, such as the pattern that users tend to include in their natural language queries data that they have seen or otherwise been provided with recently (e.g., as specific filter terms). For example, by storing cell values that have been presented to a user on an application dashboard, a data access system is able to use fuzzy matching on the stored, previously-presented cell values to respond accurately to a subsequent natural language query from the user, even when there is no pre-generated index for the underlying data source that will be queried to generate a response. The data access system performs a fuzzy match based on the natural language query and on the cell values being stored in the personalized data cache. The data access system may then use the results of the fuzzy match to determine the semantic meaning of the natural language query, execute a data retrieval operation based on the semantic meaning of the natural language query, and return an accurate response with respect to the natural language input.

In some embodiments, a user's natural language query mentions a string value displayed on the user's application interface, and the data access system generates a visualized rendering in response to the natural language query using fuzzy matching on columns, cell values, or other entities mentioned in the natural language query. For example, a user interacts with an application interface where the user may input a natural language query requesting information about a specific client. The results of processing the natural language query (e.g., the visualization or other data to be displayed in response to the natural language query) may be communicated to a fuzzy match system where individual data items (e.g., the cell values) to be displayed on the application interface are also stored in a personalized data cache. The personalized data cache is significantly smaller and less resource intensive to maintain and use than a pre-generated index of the entire enterprise database repository (e.g., several orders of magnitude smaller than the enterprise database repository). To determine the semantic meaning of a subsequent natural language query from the user, the fuzzy match system performs string similarity comparison with the data stored in the personalized data cache, and does not use any fuzzy index of the underlying data set(s) in the enterprise database repository that was generated before the natural language query was received; no pre-indexing step across the entire enterprise database repository is performed. Matching results may include filter values, field names, and other data entities that are used by the data access system to determine the semantic meaning of the subsequent natural language query (e.g., by using a text-to-code model that generates executable query instructions). The semantic meaning is then used obtain a data set that matches the natural language query and communicate the data set to a visualization rendering system that provides a response to the user natural language query.

In some embodiments, a user's natural language query does not result in a fuzzy match with a string value that has previously been displayed on a user's application interface or otherwise provided to the user. For example, the user's personalized data cache may not have information related to the natural language query because no related value has previously been displayed to or provided to the user. The fuzzy match system receives the natural language query, performs string similarity comparison with the data stored in the personalized data cache, and determines that the natural language query is not sufficiently similar to data stored in the personalized data cache. The fuzzy match system determines that information matching terms in the natural language query may exist in another data store, and executes a fallback procedure to obtain the additional data for fuzzy matching. The fuzzy match system retrieves a limited number additional values from certain columns in a data set currently available to the user. For example, the fuzzy match system obtains values for a data set column that has a low degree of cardinality (e.g., cardinality under a maximum value, such as a column having less than 1000 unique cell values). The fuzzy match system uses the retrieved values to determine the semantic meaning of the natural language query, as done with value in the personalized data cache. The fuzzy match system may also store the additional values in the personalized data cache for use in processing future natural language queries. The process of acquiring additional data for the personalized data cache and subsequent fuzzy matching allows for increased coverage of possible query terms using the personalized data cache, while avoiding use of the significant resources required to pre-index (and maintain the index) for an entire enterprise database repository.

Various aspects of the disclosure will be described with regard to certain examples and embodiments, which are intended to illustrate but not limit the disclosure. Although aspects of some embodiments described in the disclosure will focus, for the purpose of illustration, on particular examples, the examples are illustrative only and are not intended to be limiting. In some embodiments, the techniques described herein may be applied to additional or alternative implementations. Additionally, any feature used in any embodiment described herein may be used in any combination with any other feature or in any other embodiment, without limitation.

Example Data Access System

With reference to an illustrative example, FIG. 1 shows user application interfaces 114A, 114B, and 114C (e.g., dashboards) which a user may use to interact with a data access system 100 that provides access to data based on user authentication, fuzzy matching, and natural language query input. As shown, the data access system 100 includes a front end 102 to facilitate interaction between user devices and the data access system 100, a data access interface 104 to execute database queries, a fuzzy match service 106 to leverage a personalized data cache 110 in interpreting a natural language query, a query processor 108 to convert natural language queries into database queries, the personalized data cache 110 to store data previously provided to a user device, and a data store 112 that is queried in response to a natural language query from a user.

Figure 5:
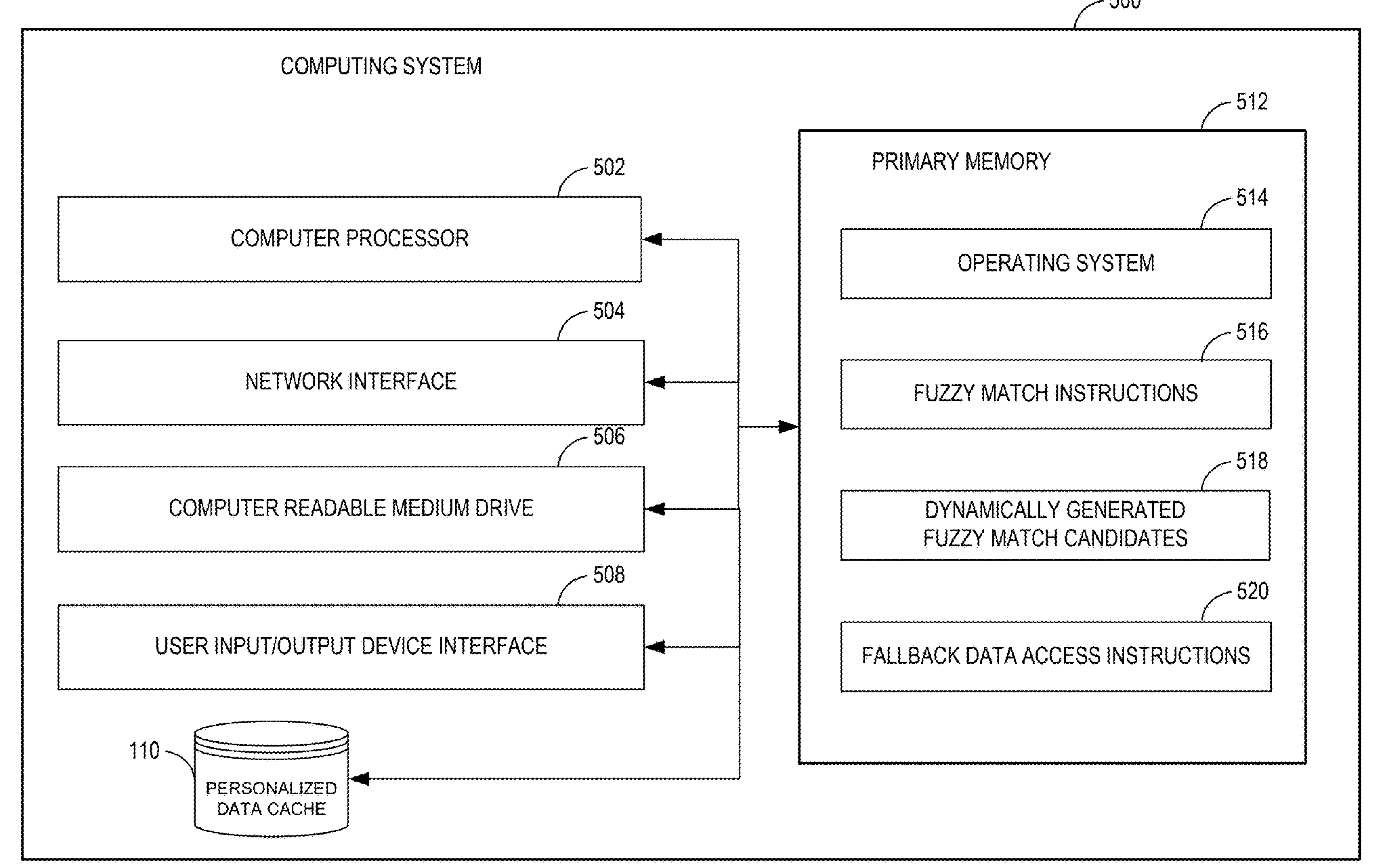
FIG. 5 is a block diagram of an illustrative computing system configured to provide an accurate response to a natural language query.

The data access system 100 may be implemented on one or more physical server computing devices that provide fuzzy match-based data access services to users. In some embodiments, the data access system 100 (or individual components thereof) is implemented on one or more host devices, such as blade servers, midrange computing devices, mainframe computers, desktop computers, or any other computing device configured to provide computing services and resources. For example, a single host device may execute one or more components of the data access system 100. The data access system 100 may include any number of such hosts. FIG. 5 illustrates an example computing device that may be used.

In some embodiments, the features and services provided by data access system 100 are implemented as web services consumable via communication network. In further embodiments, the data access system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, an application interface 114A, 114B, or 114C is provided to a user's computing device as a network resource, such as a web page defined by a Hypertext Markup Language (HTML) file or stream. The network resources defining the application interfaces 114A, 114B, and 114C may include instructions for presenting visualized responses to natural language queries and the like. For example, as shown, presentation of the application interface 114B and 114C may include a visual response 122 to a first natural language query and a visual response 124 to a second natural language query respectively.

In the illustrated example, a user interacts with a data access system 100, specifically a front end 102 that produces an application interface 114A. The interaction includes entry into a natural language query input 120 where the user's first natural language query is submitted. The first natural language query is processed using the data access interface 104 that retrieves data stored in a data store 112. The data includes data responsive to the natural language query, such as data related to sales performance, inventory quantity, analytical data, raw data, or the like. The data access interface 104 upon retrieving data based on the first natural language query, sends to the data to the front end 102 or another component that processes the data, generating a visual representation of the data that is sent to the user device, as illustrated in the application interface 114B. Additionally, the data retrieved for generating the visualization is communicated to a fuzzy match service 106, which communicates the data to be stored in a personalized data cache 110. In some embodiments, such as when the personalized data cache 110 is on a computing system that is physically separate from the fuzzy match service 106, the data access interface 104 communicates the data retrieved for generating the visualization directly to the personalized data cache 110, rather than through the fuzzy match service 106. In some embodiments, data provided to a user in response to any interaction, including but not limited to natural language queries, is stored in the personalized data cache 110.

The personalized data cache 110 is a data store utilized to store data (e.g., columns, cell values) that is provided to a user device via data access interface 104, making the data available for fuzzy matching future natural language queries via the fuzzy match service 106. In some embodiments, data is stored in the personalized data cache 110 as tuples with column names (or other category identifiers) and values (such as cell values) for the individual data items accessed in response to user interactions.

The data stored in the personalized data cache 110 may be available to be utilized for a limited period of time (e.g., minutes, hours, or days) based on a configured time to live (TTL). The TTL may be configured based on data requirements such as frequency of data utilization, relevance of data cached, and the like. In some embodiments, the personalized data cache 110 is accessible to the fuzzy match service 106 in near-real-time for enhanced user experience providing low latency responses to the natural language query. For example, the personalized data cache 110 may be maintained in memory of the computing system executing the fuzzy match service 106, or stored in low latency persistent storage such as a solid state drive (SSD) that is integrated into the computing system executing the fuzzy match service 106 or available via a low latency network link.

A user may input a second natural language query, as illustrated in application interface 114B, where the second natural language query may request information about data—or otherwise refer to data—that is visually presented in the visual response 122 on the application interface 114B in response to the previous natural language query. The second natural language query is processed via fuzzy match service 106 which advantageously uses cell values being stored in the personalized data cache 110 to perform the fuzzy match and identify query terms that aid in converting the second natural language query into an executable database query. For example, the fuzzy match service 106 performs string similarity comparison to identify one or more matches between the second natural language query and the columns, cell values, or other entities in the personalized data cache 110. Matching terms may be column names, filter fields, group-by values, or other query terms for the executable query that is eventually generated.

The query processor 108 uses the fuzzy matches between the second natural language query and data stored in the personalized data cache 110 to generate executable instructions (e.g., an executable database query) to obtain a data set requested by the second natural language query stored in the data store 112. The data set is communicated to a visualization rendering system, such as front end 102, that provides a visual response 124 to the second natural language query based on the fuzzy matching data that was stored in the personalized data cache 110 from a user's first natural language query response.

In some embodiments, the fuzzy match service 106 performs a fuzzy match operation (e.g., string similarity comparison) that does not result in a match between the personalized data cache 110 and the second natural language query. For example, the second natura language query requests information regarding data that is not displayed on user interface 114B or stored in the personalized data cache 110 based on a prior natural language query. To provide additional data against which to perform fuzzy matching on the second natural language query and interpret the query, the fuzzy match service 106 may request additional data to be obtained such as low cardinality data from a data store 112 (e.g., a sample of data from a column with a low number of different values). Low cardinality data is a set of data, such as values in a particular column of a data set, that exhibits a limited degree of variance. For example, the low cardinality data obtained for use as additional data may be data from a column with less than a threshold number of unique values, such as less than 1,000 unique values. The additional (low cardinality) data is communicated to the fuzzy match service 106 to perform a string similarity comparison between the second natural language query and the additional data. The additional data is also stored in the personalized data cache 110 to be available for fuzzy matching against future natural language queries.

The determination of a match between the second natural language query and the low cardinality additional data obtained from the data store 112 aids the query processor 108 in generating a database query to obtain the data set that matches the second natural language query stored in the data store 112. The data set is communicated to a visualization rendering system that provides a response to the users second natural language query based on the fuzzy matching of low cardinality additional data that was stored in the data store 112.

Example Data Access System Routine

Figure 2:
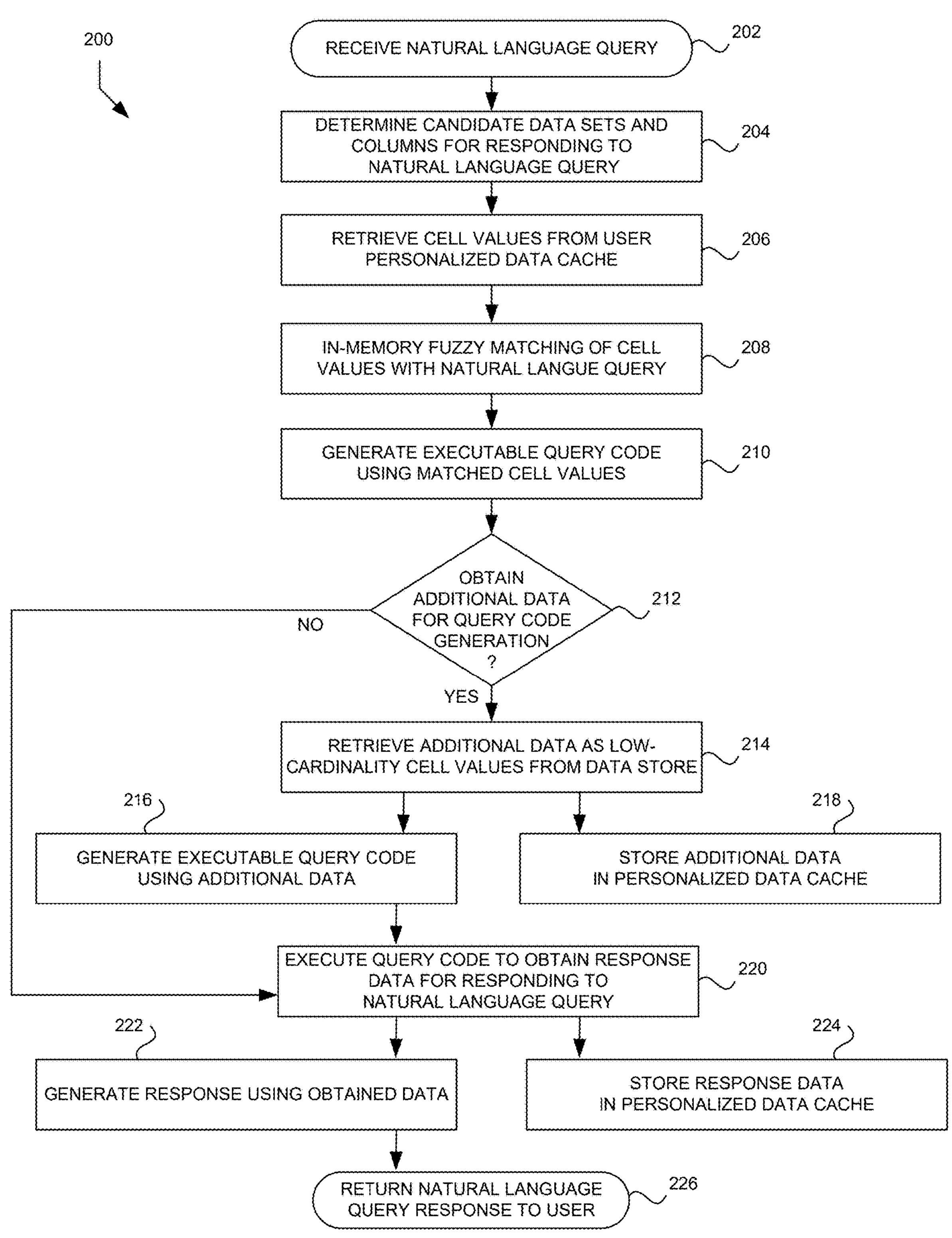
FIG. 2 is a flow diagram of an illustrative routine for responding accurately to a natural language query.

FIG. 2 illustrates example routine 200 for using fuzzy matching of personalized cache data to interpret a natural language query into an executable database query. Portions of the routine 200 will be described with reference to the example data flows and actions illustrated in FIG. 3.

When the routine 200 is initiated, a set of executable program instructions stored on one or more non-transitory computer-readable media (e.g., hard drive, flash memory, removeable media, etc.) may be loaded into memory (e.g., random access memory or RAM) of a data access system 100, such as the computing system 500 shown in FIG. 5, and executed by one or more processors. In some embodiments, the routine 200 or portions thereof are implemented on multiple processors, serially, or in parallel.

At block 202, the data access system 100 receives a natural language query from a user. For example, the natural language query may be obtained via a front end 102 and provided to a data access interface 104. The natural language query may request information regarding data that is accessible by a specific user (e.g., based on a user profile of the user). The natural language query can undergo validation check where the data access system 100 can perform a verification that a user is authorized to access the data sets related to a natural language query based on user credentials. The authorization can be implemented by row-level security (RLS) and/or column-level security (CLS) restricting users to access data rows and columns based on user credentials.

At block 204, data access system 100 determines candidate data sets and columns from which to obtain data in response to the natural language query. The relevant data sets and columns may be determined based on a text-to-code model (e.g., a large language model or other machine learning model) that produces rankings of the relevance of columns in a data set schema with respect to a natural language query, as described in greater detail herein. In some embodiments, the relevant data sets and columns are determined by fuzzy matching schema data with the natural language query utilizing the fuzzy match service 106. The fuzzy match service 106 utilizes a fuzzy matching algorithm to identify string values from the natural language query that match (e.g., are sufficiently similar to) schema data regarding data stored in the personalized data cache 110. In some embodiments, the fuzzy match service 106 uses configuration data regarding a dashboard or other user interface through which the natural language query is received or with which the natural language query is otherwise associated. For example, configuration data for a dashboard may include a listing of data sets available to be accessed via the dashboard, and schemas for those data sets. The fuzzy match service 106 may perform a fuzzy match of the natural language query with respect to the listing of data sets and corresponding schemas to determine which datasets, and which columns of those data sets, are most likely being referenced in the natural language query and are therefore likely to be useful in generating a database query to respond to the natural language query.

At block 206, the fuzzy match service 106 retrieves cell values from the personalized data cache 110 for the fuzzy matching algorithm. The data stored in the personalized data cache 110 may include data that is regularly viewed by the user and/or data that is currently being viewed by the user. The data may be related to information viewed on the user dashboard that is frequently associated with the user natural language query. In some embodiments, particular cell values are chosen for fuzzy matching against the natural language query based on the cell values being values from columns identified as being relevant to responding to the natural language query, as described in block 204.

At block 208, fuzzy match service 106 utilizes a fuzzy matching algorithm and performs a fuzzy match between data from relevant columns stored in the personalized data cache 110. The fuzzy matching algorithm can identify similarities between the natural language query and the cell value utilizing string similarity matching and implementing a ranking system. For example, the most relevant match may include information such as filter values, field names, and other data entities. Advantageously, performing the fuzzy matching against a relatively small amount of data from the personalized data cache 110—in comparison with the entire data store 112—allows the entity maintaining the data access system 100 to avoid generating fuzzy matching indexes for all data in the data store 112. In some embodiments, the fuzzy matching between the data from the personalized data cache 110 and the user natural language query is performed in a computer-readable memory of a computing system executing routine 200. Performing the fuzzy matching within memory (e.g., the computer-readable memory 512) may involve generating and storing all permutations to be used by the fuzzy matching algorithm during time of retrieval of the relevant columns and natural language query. Using a limited set of values identified from the personalized data cache 110 as described herein reduces the computation time and reduces the memory utilization for performing the fuzzy matching.

Figure 3:
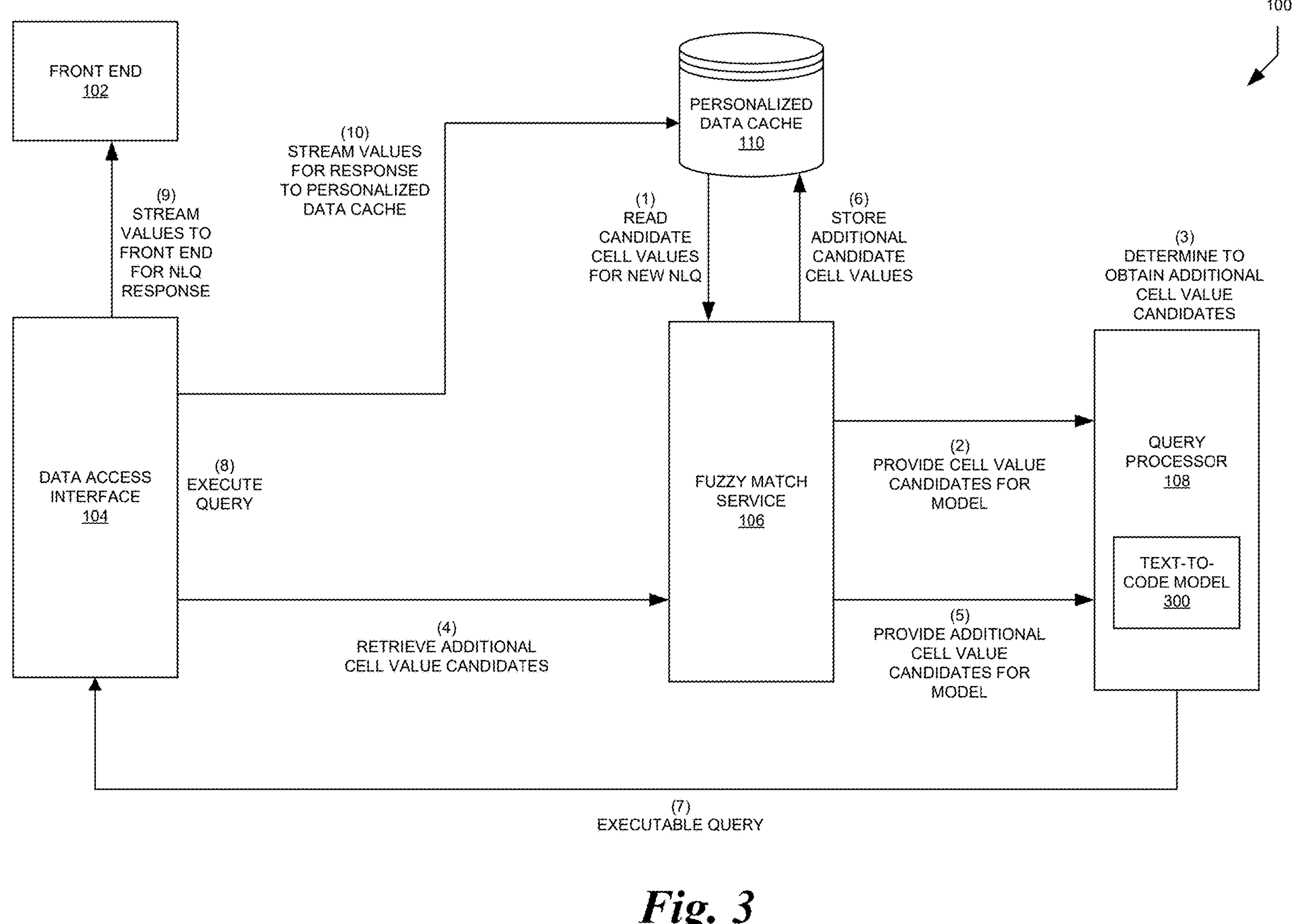
FIG. 3 is a block diagram of illustrative process flow when responding accurately to a natural language query.

As shown in FIG. 3, fuzzy match service 106 retrieves candidate cell values from the personalized data cache 110 at (1). The fuzzy match service 106 executes a fuzzy matching algorithm with the candidate cell values and the natural language query to identify terms in the natural language query that have recently been provided to the user device or devices associated with the user's profile. The fuzzy match service 106 sends matching results to the query processor 108 at (2).

Returning to FIG. 2, at block 210 the query processor 108 generates executable query code based on matches between the cell values and the natural language query. The executable query code, when processed by the data access interface 104, provides a response for the natural language query. The query processor 108 utilizes a text-to-code model (e.g., a large language model or other machine learning model) configured to generate executable database query code to be executed by the data access interface 104.

At decision block 212, the query processor or another component of the data access system 100 determines whether to obtain additional data for query code generation. The determination may be based on factors such as a confidence in executable query code generation, existence of data responsive to the generated executable query code, another factor, or a combination thereof. In some embodiments, the query processor 108 uses a text-to-code model to generate executable query code from a natural language query and values obtained from fuzzy matching against the personalized data cache, as described with respect to block 210. The text-to-code model may generate a confidence score in addition to the executable query code, and the confidence score may indicate a degree of confidence that the generated executable query code is correct or adequate to respond to the natural language query. If the confidence score satisfies a threshold, then the query processor 108 may determine that no additional data is needed and the routine 200 proceeds to block 220. In some embodiments, the operations of decision block 212 and block 220 are combined, such that the executable query generated by the query processor 108 is executed to determine whether any response data exists in the data store 112 (e.g., to determine whether any records will be returned in response to executing the query). If response data exists, the routine 200 may proceed to blocks 222 and 224.

At block 220, the data access interface 104 executes the query code to obtain response data from the data store 112.

At block 222, response data obtained from execution of the executable query code is sent to the front end 102 or another component of the data access system 100, which generates the natural language query response as a visualization rendering in response to the user natural language query.

Additionally, at block 224, the data access interface 104 communicates the response data to the personalized data cache 110 for subsequent natural language queries.

At block 226, the visualization rendering is communicated to the user device from which the natural language query was received. As shown in FIG. 1, the front end 102 may generate a visualization of the results in various ways (e.g., charts, graphs, raw data, etc.).

Referring back to decision block 212, if the query processor 108 determines to obtain additional data for query code generation (e.g., based on a low degree of confidence in executable query code that the query processor 108 has generated, or based on a lack of response data in data store 112 for the executable query code), the routine 200 proceeds to block 214.

At block 214, the query processor 108 determines that data matching terms in the natural language query—or that may otherwise assist in generating executable query code—may exist in another data store, and initiates execution of a fallback procedure to obtain the additional cell values for fuzzy matching. In some embodiments, as shown in FIG. 3 at (4), the fuzzy match service 106 retrieves a limited number of additional cell values from certain columns in a data set currently available to the user. For example, the fuzzy match service 106 obtains cell values for a data set column that has a low degree of cardinality (e.g., cardinality under a maximum value, such as a column having less than 1,000 unique cell values). The fuzzy match service 106 performs fuzzy matching of the natural language query against the additional cell values, and provides matching results to the query processor 108 as additional candidate cell values at (5).

At block 216, the query processor 108 generates executable query code, that when executed by the data access interface 104, provides a response to the natural language query based on identifying a match between the additional cell values and the natural language query. The query processor 108 generates a prompt for the text-to-code model, instructing the model to generate executable code using the additional data to guide the model's understanding of the natural language query.

At block 218, the additional cell values are stored in the personalized data cache 110 for subsequent user natural language queries, as also shown in FIG. 3 at (6). The routine 200 proceeds to block 220, as described above. For example, as shown in FIG. 3, the query processor generates executable query code and provides the code to the data access interface 104 at (7). The data access interface executes the query at (8) to obtain response data for responding to the natural language query.

The data access interface 104 then streams cell values to the front end 102 at (9) for use in generating a visualization or other display to be presented on a user device in response to the natural language query. Additionally, the data access interface 104 streams a copy of the cell values to the personalized data cache 110 at (10). The cell values are accessible by a specific user and may undergo validation check where the data access system 100 can perform a verification that a user is later authorized to access the data sets and cell values related to a subsequent natural language query based on user profile or credential. The authorization can be implemented by RLS and/or CLS restricting users to access data rows and columns based on user credentials.

Additionally, personalized data cache 110 may be available to be utilized for a limited period of time (e.g., minutes, hours, or days) based on the configured TTL. The TTL may be configured based on data requirements such as frequency of data utilization, relevance of data cached, and the like. The personalized data cache 110 is accessible to the fuzzy match service 106 in near-real-time for enhanced user experience.

Example Response Generation to NLQ

Figure 4:
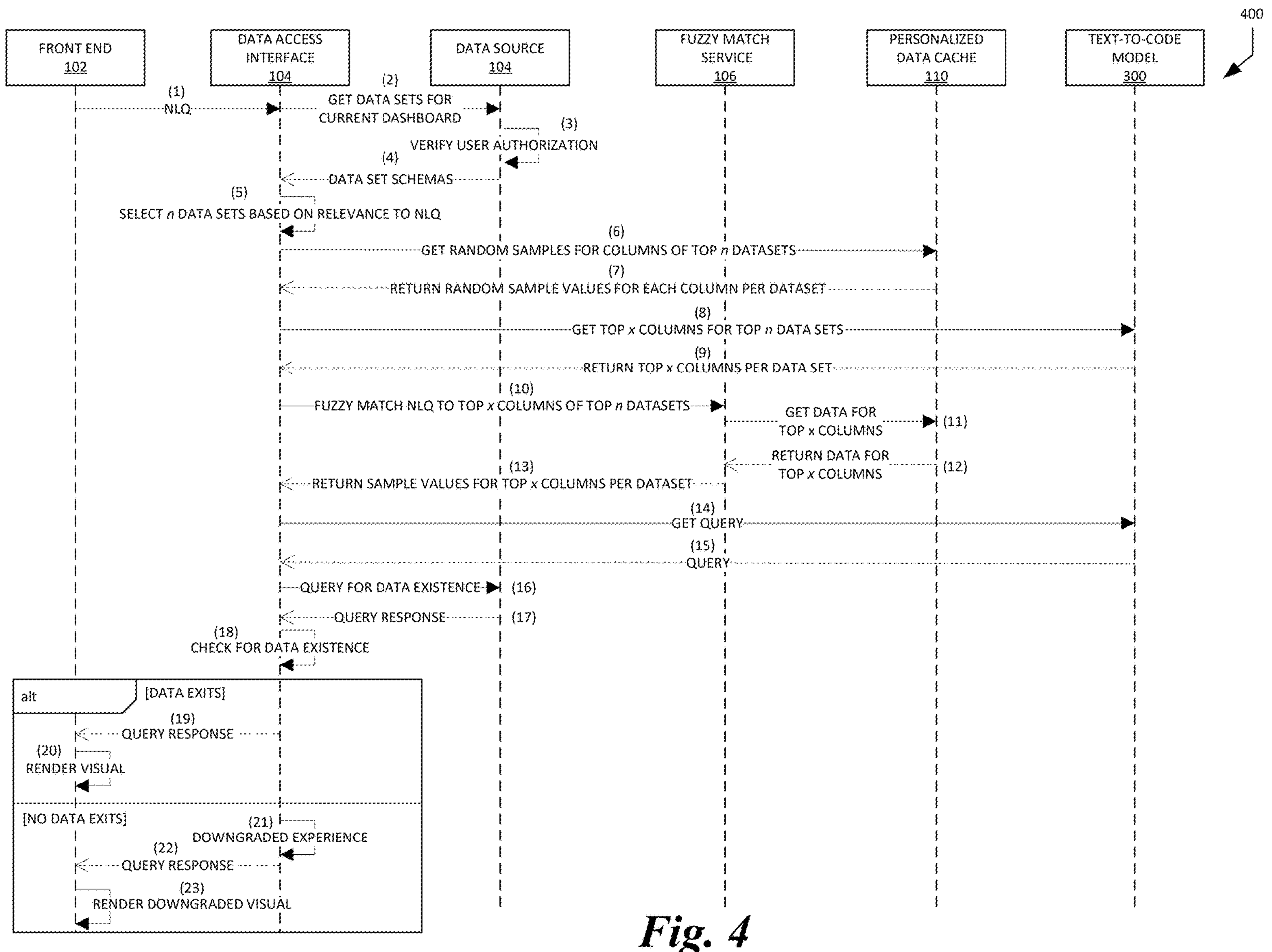
FIG. 4 is a sequence diagram of an illustrative process when responding accurately to a natural language query.

FIG. 4 is a sequence diagram 400 illustrating example data flows and interactions occurring during generation of a response to a natural language query (NLQ) received from a user device. At (1) a natural language query received by the front end 102 from a user device is sent to the data access interface 104. The natural language query may request data regarding or associated with data that is current displayed on the user device, or that was previously provided to the user device. For example, the NLQ may request client related information (e.g., revenue stream, sales performance, inventory quantity, analytical data, raw data, etc.) related to a client about whom the user recently requested information.

At (2), the data access interface requests data sets for a current dashboard through which the NLQ was submitted. Dashboards typically provide access to, and summaries of, of different related data sets, presented in a way that makes the related information easier to understand. Dashboards includes various types of data visualizations, such as graphs, charts, and tables. Determining which data sets are available through the dashboard is a first step to interpreting an NLQ submitted through the dashboard.

At (3), an authorization check of user based on a user profile associated with the retrieved data set and a natural language query is performed. For example, the data store 112 may perform the authorization check by way of implementing RLS and/or CLS. The RLS and CLS permit authorized users based on a profile match to authorized to view and or retrieve data set columns, data set schemas, and cell values based on the user credentials. Data store 112 authenticates the user profile and the data set columns and cell value and at (5) communicates the data sets associated with the dashboard to the data access interface 104.

At (5), the data access interface 104 query processor 108 receives the data sets associated with the dashboard (or information regarding the data sets, such as schemas, sample values, etc.) and, selects a subset of the data sets if there are more than a threshold number of data sets. For example, if there are more than n data sets (where n is a predetermined or dynamically determined number, such as 3), the data access interface 104 may select n data sets for further analysis.

In some embodiments, the data access interface 104 obtains the data set columns, data set schemas, and cell values for the dashboard data sets and begins the process of pruning to the top n (e.g., 3) data sets that are most relevant to the natural language query. For example, fuzzy match service 106 may perform a variation of fuzzy matching based on a fuzzy matching algorithm of the NLQ and the column names in every data set and provides a score for each column. Fuzzy match service 106 takes the average of the top m scoring columns (e.g., the top 5 scores) of each data set and identifies the top n data sets based on the average scores.

At (6), data access interface 104 begins determining the relevance of the top n data sets with the natural language query utilizing a text-to-code model 300, such as a large language model or other machine learning model. The data access interface 104 requests sample values for columns of the top n data sets from the personalized data cache 110 (either directly or via the fuzzy match service 106). The random samples will be used to provide information to the text-to-code model 300 about the content of the columns for ranking the top columns in a subsequent step. At (7), the sample values are returned from the personalized data cache 110. At (8), the data access interface 104 requests text-to-code model 300 to rank the columns of the top n data sets so that the data access interface 104 can narrow down the total universe of columns upon which fuzzy matching is eventually performed. The request may include the NLQ, the column names (or other column identifiers), and the sample values obtained from the personalized data cache 110. The text-to-code model predicts the relevancy of each column to the NLQ, using the values, column names, and terms identified for the NLQ in prior steps.

At (9), the ranked columns are communicated to the data access interface 104. The rankings may be used to identify the top x columns per data set, which is a subset of all columns in the data set. In some embodiments, x is significantly less than y, where y is the total number of columns across all data sets. By ranking the columns and selecting only the top x (e.g., the top 3) to proceed with to fuzzy matching, the overall computing resources used to perform fuzzy matching may be scientifically reduced in comparison with using all y columns or a large subset thereof.

At (10), the data access interface 104 requests fuzzy matching, by the fuzzy match service 106, of the NLQ against the data in the personalized data cache 110 for the top x columns. At (11) the fuzzy match service 106 requests the data in the personalized data cache 110 for the top x columns, and the personalized data cache 110 provides the data at (12). At (13), the fuzzy match service 106 performs fuzzy matching of the NLQ against the values returned from the personalized data cache 110, and sends the top matching values to the data access interface 104 for use as samples.

At (14), the data access interface 104 requests that a query be generated by the text-to-code model 300. The request may include the NLQ, identifiers of the top x columns that have been determined thus far, and the sample values from the personalized data cache 110 for the columns. The text-to-code model 300 may generate an executable database query based on the input, and send the query to the data access interface 104 at (15).

At (16), the data access interface 104 can execute the query against the data store 112. The response received at (17) may be response data or an indication that the there is no response data or there is an error executing the query. At (18), based on the response, the data access interface 104 determines whether data responsive to the generated query. If the response data exists, it is provided to the front end 102 at (19). The front end generates a visualization of the data at (20) and provides it to the user device.

In cases where the response data does not exist for the generated query, a downgraded experience may be initiated at (21). The downgraded experience may be initiated by excluding portions of the query, such as filter terms or group by terms that are resulting in no data being returned. The downgraded results are provided to the front end at (22). The front end generates a visualization of the downgraded experience at (23).

Example Environment

FIG. 5 illustrates various components of an example computing system 500 configured to implement various functionality described herein.

In some embodiments, as shown, a computing system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; one or more input/output device interfaces 508; one or more personalized data caches 110; and one or more computer-readable memories 512, such as random access memory ("RAM") and/or other volatile non-transitory computer readable media.

The computer-readable memory 512 may include computer program instructions that one or more computer processors 502 execute and/or data that the one or more computer processors 502 use in order to implement one or more embodiments. For example, the computer-readable memory 512 can store an operating system 514 to provide general administration of the personalized relevant cell value storage system 500. As another example, the computer readable memory 512 can store fuzzy match instructions 516 for processing natural language queries and providing a natural language query response based on data stored in the personalized data cache 110. As another example, the computer-readable memory 512 can store dynamically generated fuzzy match candidates 518 in response to a performing the fuzzy match instructions 516. As another example, the computer-readable memory 512 can store fallback data access instructions 520 for determining a natural language query response based on low cardinality data stored in the personalized data cache 110.

Terminology and Additional Considerations

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method (including computer-implemented method), process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A system comprising:

computer-readable memory storing computer-executable instructions; and one or more processors in communication with the computer-readable memory, wherein the computer-executable instructions, when executed by the one or more processors, configure the one or more processors to:

provide, to a client device associated with a user profile, a data visualization based on a first data set stored at a data source;

store, in a personalized data cache associated with the user profile, a copy of data in the data visualization, wherein the personalized data cache is separate from the data source;

receive a natural language query from the client device, wherein the natural language query comprises a request for response data associated with a least one item of data in the data visualization;

perform in-memory fuzzy matching without using a full fuzzy index of the data source, using the natural language query and items of data retrieved from the personalized data cache;

obtain, from results of the fuzzy matching, a set of query terms for querying the data source;

generate an executable query using the set of query terms and a large language model;

execute the executable query to obtain the response data from the data source; and generate a response to the natural language query using the response data.

2. The system of claim 1, wherein obtaining the set of query terms comprises obtaining at least one of a filter value, a grouping value, or a column name.

3. The system of claim 1, wherein the computer-executable instructions, when executed by the one or more processors, further configure the one or more processors to:

determine a plurality of data sets associated with a dashboard, wherein the natural language query is received via the dashboard;

rank a set of columns from each data set of the plurality of data sets based on similarity to one or more entities in the natural language query; and select a first data set of the plurality of data sets based on the first data set being associated with a highest ranking set of columns, wherein the first data set comprises the response data.

4. The system of claim 1, wherein the computer-executable instructions, when executed by the one or more processors, further configure the one or more processors to:

determine, based on results of generating the executable query, to perform additional fuzzy matching on data from the data source;

obtain, from the data source, a sample of values from a column of a data set having a degree of cardinality below a threshold; and perform the additional fuzzy matching using the natural language query and the sample of values to obtain one or more additional query terms of the set of query terms.

5. A computer-implemented method comprising:

receiving a natural language query associated with a user profile, wherein the natural language query comprises a request for response data;

performing fuzzy matching using the natural language query and a personalized data cache storing a copy of data previously provided in response to interactions associated with the user profile, wherein the personalized data cache is separate from a data source storing the response data, and wherein the fuzzy matching does not use any fuzzy index of the data source generated prior to receiving the natural language query;

obtaining, from results of the fuzzy matching, a set of query terms for querying the data source, wherein the data source stores the response data and the data previously provided in response to interactions associated with the user profile;

obtaining the response data from the data source using the set of query terms; and generating a response to the natural language query using the response data.

6. The computer-implemented method of claim 5, wherein obtaining the set of query terms comprises obtaining at least one of a filter value, a grouping value, or a column name.

7. The computer-implemented method of claim 5, wherein performing the fuzzy matching comprises executing a fuzzy match algorithm in memory after retrieving data items stored in the personalized data cache in response to receiving the natural language query.

8. The computer-implemented method of claim 5, further comprising storing a copy of the response data in the personalized data cache, wherein the copy of the response data is used in performing fuzzy matching using a subsequent natural language query associated with the user profile.

9. The computer-implemented method of claim 5, wherein performing the fuzzy matching does not include using a fuzzy match index of the data source.

10. The computer-implemented method of claim 5, further comprising:

determining a plurality of data sets associated with a dashboard, wherein the natural language query is received via the dashboard;

ranking a set of columns from each data set of the plurality of data sets based on similarity to one or more entities in the natural language query; and selecting a first data set of the plurality of data sets based on the first data set being associated with a highest ranking set of columns, wherein the first data set comprises the response data.

11. The computer-implemented method of claim 10, wherein ranking a first set of columns from the first data set is based on similarity, to one or more entities in the natural language query, of a random sample of data from individual columns of the first set of columns.

12. The computer-implemented method of claim 5, further comprising:

generating executable query code using a machine learning model and initial results of the fuzzy matching;

determining, based on results of generating the executable query code, to perform additional fuzzy matching on data from the data source;

obtaining, from the data source, a sample of values from a column of a data set having a degree of cardinality below a threshold; and performing the additional fuzzy matching using the natural language query and the sample of values to obtain one or more additional query terms of the set of query terms.

13. One or more non-transitory computer-readable media comprising computer-executable instructions that, when executed by a computing system, cause the computing system to:

receive a natural language query associated with a user profile, wherein the natural language query comprises a request for response data;

perform fuzzy matching using the natural language query and a personalized data cache storing a copy of data previously provided in response to interactions associated with the user profile, wherein the personalized data cache is separate from a data source storing the response data, and wherein the fuzzy matching does not use a full fuzzy index of the data source;

obtain, from results of the fuzzy matching, a set of query terms for querying the data source, wherein the data source stores the response data and the data previously provided in response to interactions associated with the user profile;

obtain the response data from the data source using the set of query terms; and generate a response to the natural language query using the response data.

14. The one or more non-transitory computer-readable media of claim 13, wherein to obtain the set of query terms, the computer-executable instructions cause the computing system to obtain at least one of a filter value, a grouping value, or a column name.

15. The one or more non-transitory computer-readable media of claim 13, wherein to perform the fuzzy matching, the computer-executable instructions cause the computing system to execute a fuzzy match algorithm in memory after retrieving data items stored in the personalized data cache in response to receiving the natural language query.

16. The one or more non-transitory computer-readable media of claim 13, wherein the computer-executable instructions, when executed by a computing system, cause the computing system to store a copy of the response data in the personalized data cache, wherein the copy of the response data is used in performing fuzzy matching using a subsequent natural language query associated with the user profile.

17. The one or more non-transitory computer-readable media of claim 13, wherein performing the fuzzy matching does not include using a fuzzy match index of the data source.

18. The one or more non-transitory computer-readable media of claim 13, wherein the computer-executable instructions, when executed by a computing system, cause the computing system to:

determine a plurality of data sets associated with a dashboard, wherein the natural language query is received via the dashboard;

rank a set of columns from each data set of the plurality of data sets based on similarity to one or more entities in the natural language query; and select a first data set of the plurality of data sets based on the first data set being associated with a highest ranking set of columns, wherein the first data set comprises the response data.

19. The one or more non-transitory computer-readable media of claim 18, wherein ranking a first set of columns from the first data set is based on similarity, to one or more entities in the natural language query, of a pseudo-random sample of data from individual columns of the first set of columns.

20. The one or more non-transitory computer-readable media of claim 13, wherein the computer-executable instructions, when executed by a computing system, cause the computing system to:

generate executable query code using a machine learning model and initial results of the fuzzy matching;

determine, based on results of generating the executable query code, to perform additional fuzzy matching on data from the data source;

obtain, from the data source, a sample of values from a column of a data set having a degree of cardinality below a threshold; and perform the additional fuzzy matching using the natural language query and the sample of values to obtain one or more additional query terms of the set of query terms.

* * * * *